Patented Apr. 1, 1930

1,752,792

UNITED STATES PATENT OFFICE

AARON MARTIN HAGEMAN, OF BLOOMFIELD, AND ALBERT FERDINAND LINDSTROM, OF NUTLEY, NEW JERSEY, ASSIGNORS TO WESTINGHOUSE LAMP COMPANY, A CORPORATION OF PENNSYLVANIA

COMPOSITION FOR COATING VITREOUS ARTICLES

No Drawing. Application filed January 27, 1925. Serial No. 5,079.

This invention relates to compositions of matter useful in the art of coating and more particularly to the production of opalescent or colored lustrous translucent effects, when applied to glass objects, such as incandescent electric lamps.

Heretofore, certain desirable effects approaching that of the present opalescent translucent coating have been produced by using opal glass; that is, a glass containing cryolite. Such glass, by reason of the expense of production, is prohibitive for extensive use, as necessary in a commercial product, such as an electric lamp bulb. Furthermore, such glass tends to decompose liberating certain injurious gases which shorten the life of the lamp. In addition, the light absorption of opal glass is relatively high and, by reason of the variations in the thickness of the glass, the emitted light is of unequal intensity.

Other modes of treating the surface of a bulb in an endeavor to obtain opalescent and diffused light effects have been practiced. For example, hydrofluoric acid or other etching solutions have been employed. These solutions did not, however, produce the desirable opalescent effect. Moreover, extreme care must be taken in handling the solutions which make them objectionable from a practical standpoint.

In our application, Serial No. 736,855, entitled Coating compositions, filed September 10, 1924, there is described a coating compound to produce the desirable opalescent effect without the difficulties encountered by etching or using opal glass. Although satisfactory results have been obtained by the use of this composition, it has been found that by certain variations therein, even more desirable results are attainable.

By varying the proportions of certain ingredients of the composition and by the addition of other ingredients, a coating is produced which is less light absorbent and which results in a stronger and more durable bulb.

An object of the invention is to produce a coating composition applicable to the interior surface of a lamp bulb or other object for the diffusion of light.

Another object of the invention is to produce a composition which may be applied to vitreous objects and at the same time maintain the objects of normal strength.

A further object of the invention is to produce a coating composition applicable to an incandescent lamp bulb and which facilitates the union of said bulb when fused to another portion of the lamp.

Another object of the invention is to produce a coating composition which may be applied to the interior of a bulb by a flushing or spraying operation and which will flow to assume a smooth surface of even thickness.

A still further object of the invention is a coating composition which may be applied to an incandescent lamp or other object and which will quickly flow to assume a smooth layer of even thickness capable of being quickly set by subjection to a temporary heat-treatment.

A still further object of the invention is to provide a coating composition which may be quickly and conveniently applied to an incandescent lamp or other object by flushing thereover and which will assume a smooth even layer, capable of being set by temporary heat-treatment and which may be baked to provide a light diffusing coating.

Other objects and advantages will be apparent as the description proceeds.

The present coating composition or enamel may comprise a pigment, a binder, a filler, an ingredient which serves to cause the composition to assume a smooth and even coating when applied to an object and a composition capable of functioning to reduce the melting point of the composition which is applied to the glass. The binder may aid in producing opalescent effects in cooperation with a filler, although when colored effects are desired, a separate pigment may be added to the composition.

A more or less opaque filler may be employed to render a light transmitting material such as a clear glass bulb to which it is applied, of a light diffusing character and to produce an opalescent or pearly effect. The filler should be of a more or less translucent material so as not to arrest the passage of light to any considerable degree and the binder may be capable of suitably uniting the pigment and filler together and binding the coating to the object upon which it is laid. All of the various constituents of the composition must be of a stable character or capable of forming compounds which are unchangeable at the operating temperature of a lamp and must be capable of withstanding the heat required to seal the lamp bulb to a lamp mount.

It will be understood that heretofore in coating electric lamp bulbs, the coating was applied to the outside of the bulb after the lamp was finished; that is, after the mount or interior structure had been sealed by fusion to the bulb. This operation of sealing is important in the lamp industry and consists in supporting the so-called mount; that is, the glass portion which carries the filament, and positioning the bulb over the mount so that the interior of the neck part of the bulb is adjacent to the periphery of a flange on the mount. Gas flames are then directed to the outer portion of the bulb to locally heat the same until plastic for consolidation with the flange of the mount. The bulb is then exhausted and the screw base is subsequently applied to complete the lamp.

It will be readily appreciated that in the manufacture of large quantities of lamps, any interference to the efficient and practical union of the bulb and mount would be a decided disadvantage and tend to reduce production or increase cost. It is, therefore, desirable when interiorly coating lamp bulbs, to produce a composition which will not only perform the function of producing an opalescent or desirable light diffusing bulb but which will cooperate with the manufacturing operations and facilitate the operation of sealing the bulb to the mount or at least neutralize any inherent tendencies of a coating to raise the melting point of the glass.

The present coating includes in its composition, a low melting point flux which facilitates the sealing-in operation and also functions as a pigment.

It has been found that the application of certain coatings to a lamp bulb results in a weakening of the bulb. This weakening may be the result of certain internal stresses which are set up within the glass by reason of the shrinkage or binding action of the material laid upon the bulb.

We have found however, that by reducing the specific gravity of the binder of the composition, that a coating is produced which may be applied to a bulb without reducing the strength thereof, or if at all, approximately only a few percent of its original strength.

It is desirable, in order to obtain best results, that the solid ingredients of the composition be in a finely divided form to obtain an intimate mixture to give a smooth and even coating.

The filler for opalescent effects should preferably be white and more or less translucent and the specific gravity of the binder should be relatively low in order to provide a mixture of such a character that when applied to a lamp bulb, a compact, hard and homogeneous mass without volatile constituents will be produced and one which will avoid detrimental stresses upon the object to which it is applied.

A coating composition which has been found to meet the requirements to produce a light diffusing layer may be composed of the following ingredients and proportions. It is to be understood that variations may be made therein without departing from the invention.

We have found that by combining 100 grams of a filler of pure white kaolin or china clay which may comprise hydrated silicate of aluminum or the like, mixed with 50 grams of zinc phosphate or other low melting flux, 15 grams of caustic soda or other alkali which may be chemically pure sodium hydroxide and 1000 c. c. of a binder, composed of an aqueous solution of an alkali silicate, preferably of a low specific gravity, as for example 1.025. It has been found that zinc phosphate which performs its useful function as a flux, also serves as light diffusing substance in combination with the kaolin and the sodium silicate when hydrated. The aluminum silicate together with zinc phosphate, serves to give body to the composition to bring it to the right consistency for proper application to the objects to be coated and the alkali serves to render the enamel or coating more mobile without altering its density and causes it to assume a smooth even thin coating.

The selected substance to be used with the present composition, not only aids as a pigment but when combined with the filler, serves to lower the light absorption property thereof. We have found, however, that in place of the selected zinc phosphate as a flux, other substances may be employed as for example lead or zinc borate, lead silicate or lead oxide. These latter substances, however, produce a coating having a slight tint and to a certain degree, increase the light absorption property of the coating. It may, however, be desirable, under certain conditions, to provide a coating having a high light absorption property, in which case such fluxes may be employed.

It is desirable that the coating flow readily, since it is flushed upon the surface and must quickly take its ultimate position. The alkali which acts as a peptizing agent to increase the fluidity of the mixture, also serves to reduce the fusing temperature of the glass in cooperation with the zinc phosphate. The sodium silicate acts both as a binder and to some degree as a pigment and is, as stated, of low specific gravity, thus serving to properly bond the coating to the surface without exerting any detrimental stresses upon the surface of the bulb. The fact that the binder also serves as a pigment to produce the desirable effects is an advantage, inasmuch as it thoroughly mixes with the other ingredients and cooperates with them in providing the translucent coating, resulting in a uniform distribution of an even whiteness over the surface.

Inasmuch as the coating is deposited upon the inner surface of the bulb or other hollow object, it is observed through the material of the object and a soft lustrous effect is produced. The interposed layer of transparent or light-emitting material between the coating and the exterior of the object coated results, particularly in a case of an electric lamp bulb, in a more desirable article, since the harshness due to irregularities is absent and when used for decorative and other purposes is more harmonious and æsthetic.

When a colored coating is required, a suitable pigment may be added to the composition, the amount depending upon the particular pigment used and the intensity of the color desired. It is preferable, of course, when using a pigment to reduce the amount of the filler accordingly, so that the proper consistency of the enamel may be maintained, the pigment used must be highly resistant to heat and capable of withstanding the temperatures attained in sealing and exhaust operations and must not release deleterious gases after the lamp has been sealed.

In producing the present composition, the mixture of the several ingredients may be placed in a mixing barrel or ball mill and thoroughly agitated until a homogeneous mixture is attained. The coating may be applied to the interior of a lamp bulb or other hollow object by pouring, squirting or spraying or in any other suitable manner. It is essential that the composition be of the proper consistency so that the same may freely flow over the surface to be coated, the excess material being allowed to drain from the surface by gravity or the interior of the bulb may be subjected to a vacuum to assist in the removal of the excess material. With the proper mixture, however, it is found that when a bulb is flushed, the material will flow over the bulb and in a comparatively short time interval, leaving a smooth and uniform coating. In the method disclosed in our copending application Serial No. 5,080, filed January 27, 1925, entitled Method of coating vitreous articles and articles produced thereby, when an article has been flushed or coated, it is desirable to quickly subject the still moist coating or layer to a relatively high temperature, to produce a comparatively instantaneous setting of the coating. This heat-treatment arrests the flow of the coating and puts is in condition to be baked or subjected to a further heat-treatment at a baking temperature of from 300 to 400° C. This baking may be continued for 3 or 4 minutes or for a sufficient time to dehydrate the binder and solidify the coating, causing it to adhere to the bulb or other object. The heat also removes all the occluded gases which are contained in the coating and reduces the sodium silicate and the flux to produce a light diffusing coating.

Another advantage of the present composition resides in the fact that a bulb coated therewith, may be reclaimed; that is, if, after coating, it is desirable to remove the coating, this may be accomplished by abrading the coating with a brush, at the same time applying hot water to react in some small degree with the composition and to carry away the particles. It is practical, however, to apply a rapidly rotating brush and clean the surface thoroughly without the use of water.

The ingredients of the composition are such, that the binder does not unite with the glass to any appreciable degree. This as heretofore stated is an advantage, inasmuch as it preserves the original strength of the bulb and in addition, permits the convenient removal of the coating.

The removability of the coating is advantageous in the manufacture of certain types of lamps, as for instance, a lamp of the bowl coated type; that is, one having only an upper hemi-spherical portion coated. Such lamps may have their interior surface flushed and the coating baked thereon, after which a mechanical abrading device may be applied to remove such portions of the coating as are necessary to leave only the bowl portion covered or it may be desirable to entirely coat a lamp and remove a relatively small portion or spot to permit the transmission of undiffused light rays.

The above variations attainable, result from the novel method of coating a bulb upon the interior surface, wherein the desirable removable composition may be employed, inasmuch as such composition need not combine with the glass to the degree that is necessary when using a composition for the outer surface of the bulb which is exposed to the atmospheric conditions.

As hereinbefore set forth, when employing coatings which bond or tenaciously adhere to the glass, we have found that the strength of the bulb is materially reduced and that by reducing the specific gravity of the binder; that is, the sodium silicate or the like used in the composition, a bulb may be coated which will lose only a very small percentage of its original strength.

In coatings for the outer surface of a bulb which are subjected to atmospheric conditions and accidental mechanical abrasion, it is necessary to provide a very firm and strong coating. By reason of the application of the coating to the interior of the bulb, however, we have found that a practical and desirable coating may be produced by applying a filler such as aluminum silicate or the like to the inner surface of the bulb, a suitable vehicle such as water or other liquid may be employed to properly distribute the filler.

After application to the surface of a bulb, the bulb may be subjected to a baking operation and the resultant coating will provide the desirable light diffusing medium. This coating will, of course, be held in place by adhering to the bulb in the same manner as a white wash or cold water paint, but inasmuch as we take advantage of the fact that after a bulb is sealed, the coating is never distributed, a practical and desirable light diffusing medium results. Even though the coating is applied without the binder; that is, the sodium silicate, the tendency still remains to raise the melting point of the glass and thus make it more difficult to seal a bulb to a lamp mount. This disadvantage may, however, be avoided by adding a suitable flux, such for example as zinc phosphate or other suitable substances, so that the melting point of the glass may be lower and the sealing-in operation facilitated.

When combining a flux, such as zinc phosphate with the kaolin or aluminum silicate, the composition, when baked, gives a whiter and less light absorbing coating than is attained by the use of the aluminum silicate alone. The composition when used without the sodium silicate has other advantages, as for example the property of absorbing moisture inherent in the sodium silicate is absent from the aluminum silicate or the zinc phosphate. Bulbs so coated may be left exposed for long time intervals and inasmuch as no moisture is absorbed by the coating when exposed to the atmosphere, moisture will not be found in the bulb after sealing-in.

Without a binder, it has been found that 50 grams of kaolin or aluminum silicate, 50 grams of a flux such as zinc phosphate and 1000 c. c. of water may be properly mixed in a mixing barrel or ball mill to produce a homogeneous mixture. The coating may be applied in the same manner as above set forth; that is, by squirting and permitting to flow freely over the surface to be coated, excess material being allowed to drain by gravity.

If desirable, a suitable peptizing agent may be employed to increase the fluidity of the composition.

Although it is advisable that coated bulbs be made into completed lamps in a reasonably short time to avoid the absorption of moisture or other impurities, it has been found that bulbs used which were coated with the coating having the binder, more than a week prior to being made up into a completed lamp, give very satisfactory results.

A bulb interiorly coated as produced by the present invention is particularly desirable for certain types of electric incandescent lamps, such as those which employ a concentrated filament in which the filament is in the form of a ring and a highly intensive light source. It is desirable to avoid the glare which ordinarily accompanies the use of a lamp of this type and by reason of the present coating, such glare is diffused and a brilliant pleasing light unit is provided.

It is to be understood that although the invention as herein described is more particularly concerned with incandescent electric lamp bulbs, the use of the composition is not so limited and may be applied equally well to the coating of large varieties of objects, such as globes, shades, etc. Furthermore, the invention is not limited to the proportions stated herein but variations may be made therein and various uses made thereof without departing from the spirit and scope of the invention as defined by the appended claims.

What is claimed is:

1. A coating composition for the interior surface of vitreous articles, comprising a pigment, a filler, a binder, an alkali and zinc phosphate.

2. An enamel comprising approximately 100 grams of aluminum silicate, substantially 50 grams of zinc phosphate, 15 grams of sodium hydroxide, 1000 c. c. of a solution of sodium silicate having a specific gravity of 1.025.

3. A light diffusing composition comprising aluminum silicate and zinc phosphate.

4. A coating composition for application to the interior of an incandescent electric lamp bulb, comprising an intimate mixture of aluminum silicate and zinc phosphate.

5. A composition for application to the interior of an incandescent electric lamp bulb, comprising an aqueous suspension of aluminum silicate and zinc phosphate.

6. A composition for application to the interior of an incandescent electric lamp bulb, comprising a pigment, an aqueous suspension of aluminum silicate and zinc phosphate.

In testimony whereof, we have hereunto subscribed our names this 26th day of January, 1925.

AARON MARTIN HAGEMAN.
ALBERT FERDINAND LINDSTROM.